E. E. SLICK.
CAR AXLE.
APPLICATION FILED JUNE 9, 1915.
1,171,897.
Patented Feb. 15, 1916.
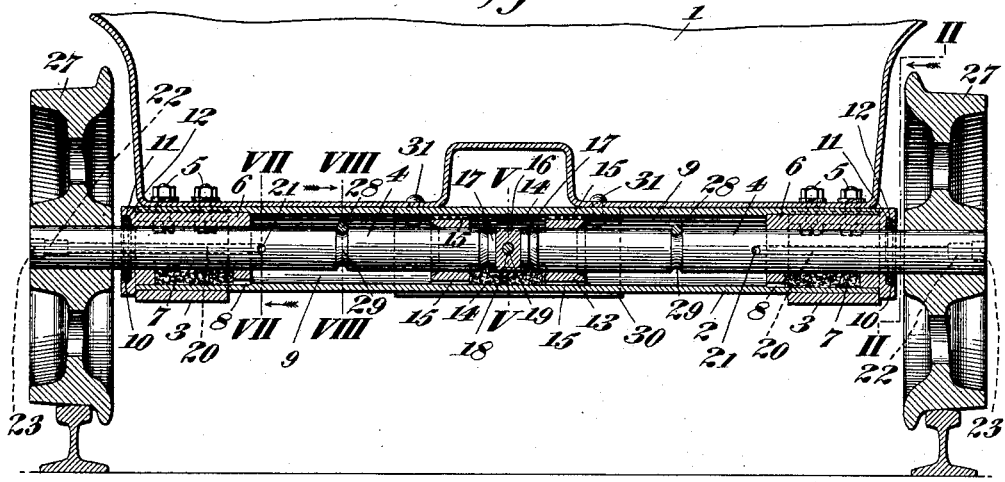
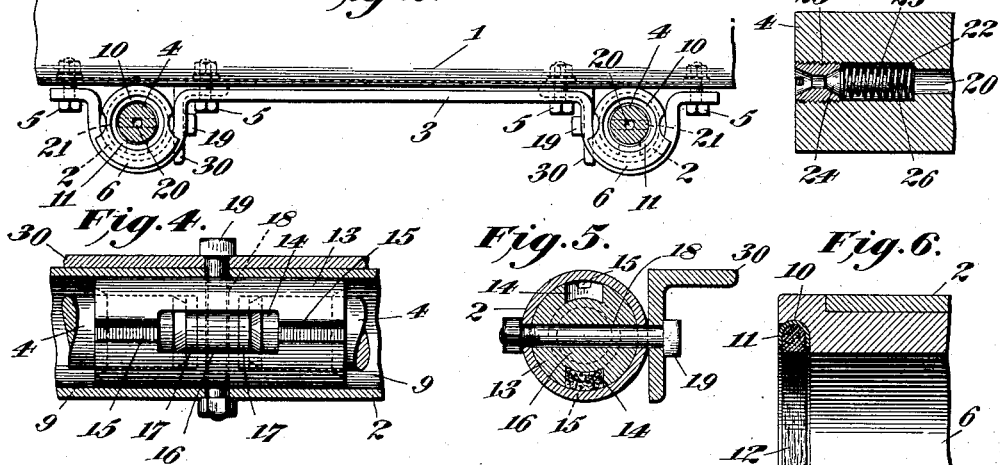
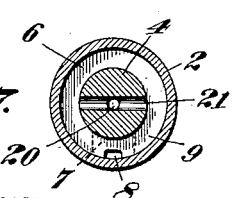
WITNESSES:
Elmer Seavey.
F. A. Stahl.
INVENTOR
Edwin E. Slick.
BY Geo. E. Thackray
his ATTORNEY
THE COLUMBIA PLANOGRAPH CO., WASHINGTON, D. C.

UNITED STATES PATENT OFFICE.

EDWIN E. SLICK, OF WESTMONT BOROUGH, PENNSYLVANIA.

CAR-AXLE.

1,171,897.  Specification of Letters Patent.  Patented Feb. 15, 1916.

Application filed June 9, 1915. Serial No. 32,997.

*To all whom it may concern:*

Be it known that I, EDWIN E. SLICK, a citizen of the United States, residing in the borough of Westmont, in the county of Cambria and State of Pennsylvania, (whose post-office address is Johnstown, Pennsylvania,) have invented certain new and useful Improvements in Car-Axles; and I do hereby declare the following to be a full, clear, and exact description of the invention, such as will enable others skilled in the art to which it appertains to make and use the same.

My invention relates to axles and their appurtenances, the construction being such that each wheel is provided with a separate axle, whereby the car or vehicle is well adapted to turn around curves of short radii. The wheels are firmly pressed on or keyed on the ends of the axles, and the axle itself is adapted to turn in suitable bearings, which bearings are arranged within a tube or pipe, which also serves as an oil or lubricant reservoir to keep the bearings in a constant state of lubrication. My axles are provided with end thrust bearings to prevent them from moving longitudinally inward and are also provided with means for preventing them from moving longitudinally outward; and in order to retain the lubricant within the reservoir, I provide means near the end of the axle for preventing its escape. Between the wheel and the end of the bearing or the end of tube or casing I provide a space so that the hub of the wheel does not rub against any adjacent fixed portions, thereby preventing the wearing or cutting of same, which latter would otherwise occur due to dirt or grit accumulating in this location, and the thrust bearing which maintains this space between the hub of the wheel and the adjacent portions, is within the tube or casing and always subjected to clean lubrication.

Each axle is preferably provided with two main bearings; namely, one outer one near the wheel and one inner one near or at the inner end of the axle, the outer one being preferably larger or longer than the inner one, as it receives more weight and consequently is subjected to more friction. I also may provide resilient, fibrous packing near or adjacent to the journals in order to maintain their lubrication; but the construction is such that the casing or tube surrounding the axle may be filled with oil, so that this fibrous packing may be omitted if desired. I prefer, however, to use this packing, as it will keep the parts lubricated in case the oil supply becomes gradually exhausted.

Having thus given a general description of my invention I will now, in order to make the matter more clear, refer to the annexed sheet of drawings, which form part of this specification :—

Figure 1 is a sectional elevation of a car, this view veing taken parallel to the axes of the axles, showing the axle bearing, the outer casing and the wheels in section, and the axles and end thrust bearing blocks in elevation. Fig. 2 is a longitudinal vertical sectional elevation of the car taken at right angles to the axes of the axles on the line II—II of Fig. 1. Fig. 3 is a vertical sectional elevation through the outer end of one of the axles on an enlarged scale in order to show the oil passages and oiling valve. Fig. 4 is a detail view of the inner bearing, the inner journal bearings being shown in top plan, and the outer casing and the attached angle being shown in section. Fig. 5 is a vertical, transverse sectional elevation through the center of the journal bearing block and casing taken on the line V—V of Fig. 1. Fig. 6 is a vertical longitudinal sectional elevation through the outer end of one of the outer journal bearings, this being drawn on an enlarged scale. Fig. 7 is a vertical transverse sectional elevation through one of the axles and the outer casing or tube taken on the line VII—VII of Fig. 1, and Fig. 8 is a vertical transverse sectional elevation through one of the axles and the outer casing or tube taken on the line VIII—VIII of Fig. 1, showing the construction which prevents the axle from moving outwardly longitudinally.

Referring now to the characters of reference on the drawings:—1 is the car body, which in this case is illustrated as a metal mine car, but, at the same time, I wish it understood that my axles are adapted to any kind of car, such as mine cars, industrial cars, standard railroad cars, tractors, or, in fact, any kind of wheeled vehicle. The outer casing or tube surrounding the axles is indicated as 2, while 3 are straps or tie plates adapted to secure the axle casing 2 to the car body, these being secured by means of the bolts 5, as shown. In this connection it should be noted that I prefer to provide a space between the car body and these straps 3 in order that the bolts 5, when the nuts are screwed up tight, shall hold the casing 2 firmly in position against the car body. The outer journal bearings are indicated as 6 and are provided with inner ends 7, surrounding the journal, which ends are provided with grooves or channels 8, whereby the oil or lubricant contained within the tube or casing can pass into the space below and around the outer journal bearings. The oil chambers within the tube or casing are indicated as 9, while 10 is a groove in the outer end of the journal bearings, adapted to receive an elastic wool or hair felt washer 12, this washer being contained in a thin metal annular holder of U-shape cross section as shown. The inner diameter of this holder is slightly greater than that of the journal bearing or axle, so that it does not contact with the same, whereas the felt washer is of smaller diameter and adapted to contact with the axle and by reason of its elasticity maintains such contact in order to prevent the escape of oil. It should also be noted that the outer edge of the groove which contains this holder is nearer the axle center than the adjacent inner part of the groove, whereby the holder may be forced from the outside into its position and then retained by means of the projections on the outside of the bearings or casing, as particularly illustrated in Fig. 6. This forms a simple and ready means for retaining the washer in proper and operative position.

The center journal bearing is indicated generally as 13, this being adapted to receive the end of one axle on one side and the end of the other axle on the other side, as illustrated. This center journal is provided with openings 14 which are adapted to permit the oil to flow through to lubricate the inner axle ends and to receive fibrous packing or waste, and are also provided with grooves 15 to allow the lubricant to penetrate to all parts. The center journal bearing is also provided with a central rib 16, against which are mounted end thrust bearing blocks, these being made separate to allow them to be replaced in case of wear, or made of different material from the other parts of the center bearing. A hole 18 is provided through the central rib 16, through which passes the bolt 19 which holds the center bearing in position and secured to the casing 2, in addition to which the bolt passes through the angle 30, which is secured to the car bottom as shown, thereby holding the casing in position and preventing it from turning. Near the outer end of the axle I provide an oil duct 20 opening by the cross channel 21 into the interior of the tube or casing, the outer end of the oil duct 22 being enlarged as shown and provided with a valve seat block 23, which is screwed into the tapped hole, as illustrated. A valve 24 is provided and adapted to seat itself against the seat block, as shown, this valve being provided with a stem 25 and with a spring 26 for normally holding it in seated position.

The car wheels are indicated as 27 and are illustrated as being made of the customary chilled cast iron, which are firmly secured on the axle by being bored to a driving fit and then pressed on; but my axle is equally well adapted to be used with other kinds of wheels, such as pressed steel plate wheels, forged steel wheels, wheels with metal hubs and wooden spokes, wheels with metal hubs and wire spokes, or all-steel built-up wheels, such as used on agricultural implements, or in fact is adapted to be used with any kind of wheel whatsoever. Each axle is provided with annular groove 29, which is shown as of semi-circular section, and passing through this groove and adapted to contact with the sides thereof is the retaining bolt 28, which bolt passes through corresponding holes in the outer tube or casing and is secured in place by a nut or key, as illustrated in Figs. 1 and 8. To the lower part of the car body are secured the angles 30 by means of the rivets 31 and to these angles the outer casing is secured as particularly illustrated in Fig. 5. The bolts 28 are provided with washers 32, as illustrated, adapted to conform to the shape of the outer tube or casing, as shown.

In order to more clearly describe my construction, I will call my axle stub axles, meaning that each wheel is provided with a separate axle.

Although I have described and illustrated my invention in considerable detail, I do not wish to be limited to the exact and specified details thereof, as shown and described, but may use such modifications in, substitutions for, or equivalents thereof, as are embraced within the scope of my invention, or as pointed out in the claims.

Having thus described my invention, what I claim and desire to secure by Letters Patent is:—

1. A pair of axles mounted within an outer tube or casing, each axle being provided with an outer bearing, an inner bearing and an end thrust bearing, a groove formed in its periphery and retaining means secured to the casing and adapted to contact with the wall of said groove.

2. A stub axle mounted within an outer tube or casing and provided with an inner and outer journal bearing and a circumferential groove, an end thrust bearing, a bolt extending through said casing and adapted to contact with the walls of said groove, and sealing means mounted on the outer end of the axle adapted to prevent the escape of lubricant from the casing.

3. A car axle mounted in an outer tube or casing and provided with an inner and outer journal bearing, a circumferential groove in said axle, a bolt passing through and secured to said casing and adapted to contact with the walls of said groove.

4. A car axle mounted within an outer tube or casing and provided with inner and outer journal bearings and a circumferential groove, means extending through said casing and adapted to contact with the walls of said groove, an end thrust bearing adapted to prevent the inward movement of said axle, the outer end of the outer bearing or casing, being spaced apart from the wheel or hub, whereby rubbing and friction at this point is avoided.

5. A car journal provided with a concentric annular groove at the outer end thereof, the outer portion of the wall of said groove being of slightly less diameter than the adjacent inner portion, an annular retainer of sheet metal containing a resilient washer, said retainer being adapted to be pressed into said groove and retained by the outer projection of the wall thereof.

In witness whereof I have hereunto set my hand in the presence of two witnesses.

EDWIN E. SLICK.

Witnesses:
 OLIVER B. HICKOX,
 FRED A. STAHL.

Copies of this patent may be obtained for five cents each, by addressing the "Commissioner of Patents, Washington, D. C."